Nov. 2, 1965   W. L. McKOWN ETAL   3,215,093
VISCOUS FLUID DEPOSITOR
Filed July 9, 1962   3 Sheets-Sheet 1
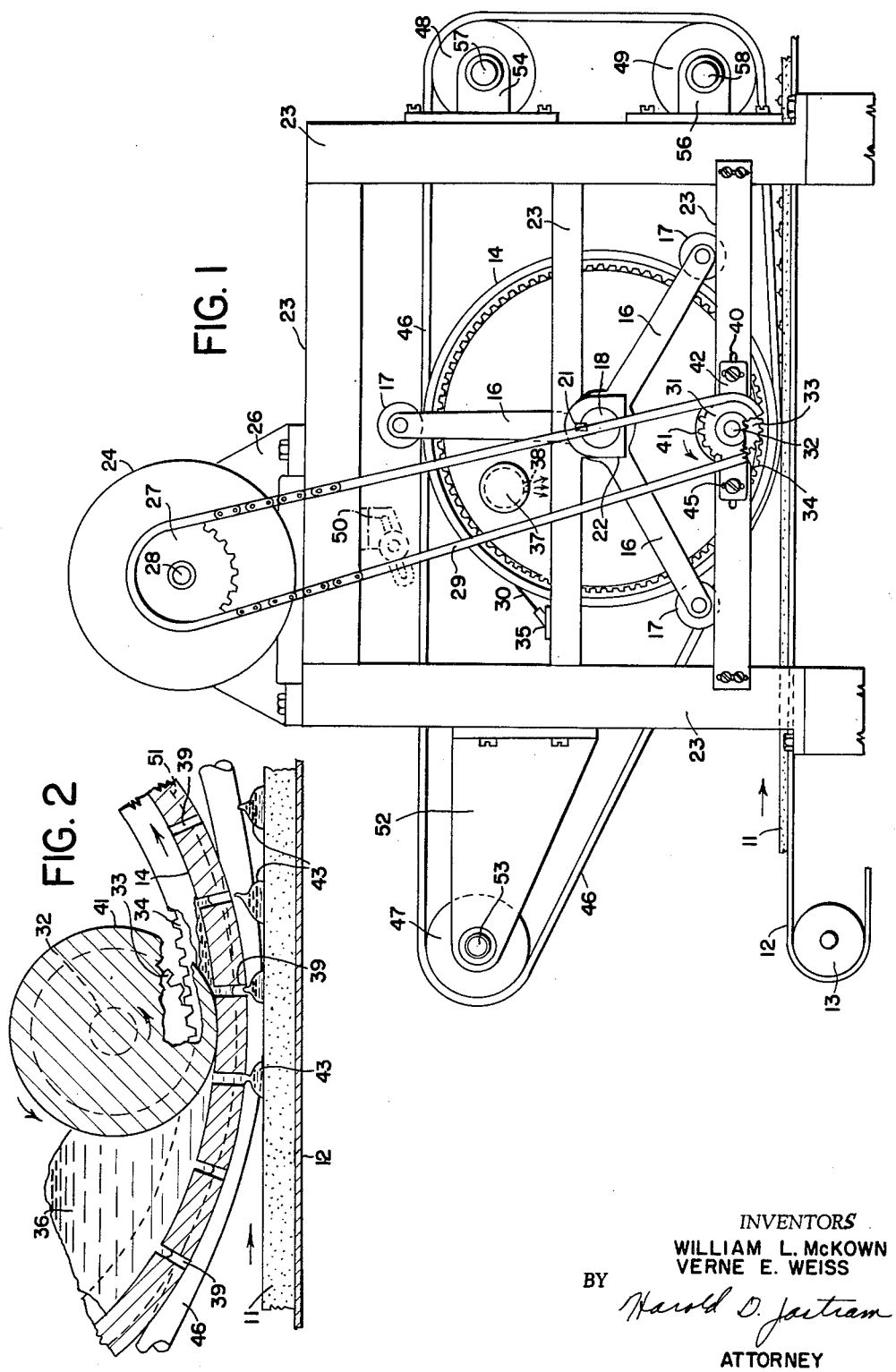
INVENTORS
WILLIAM L. McKOWN
VERNE E. WEISS
BY
Harold D. Jastram
ATTORNEY

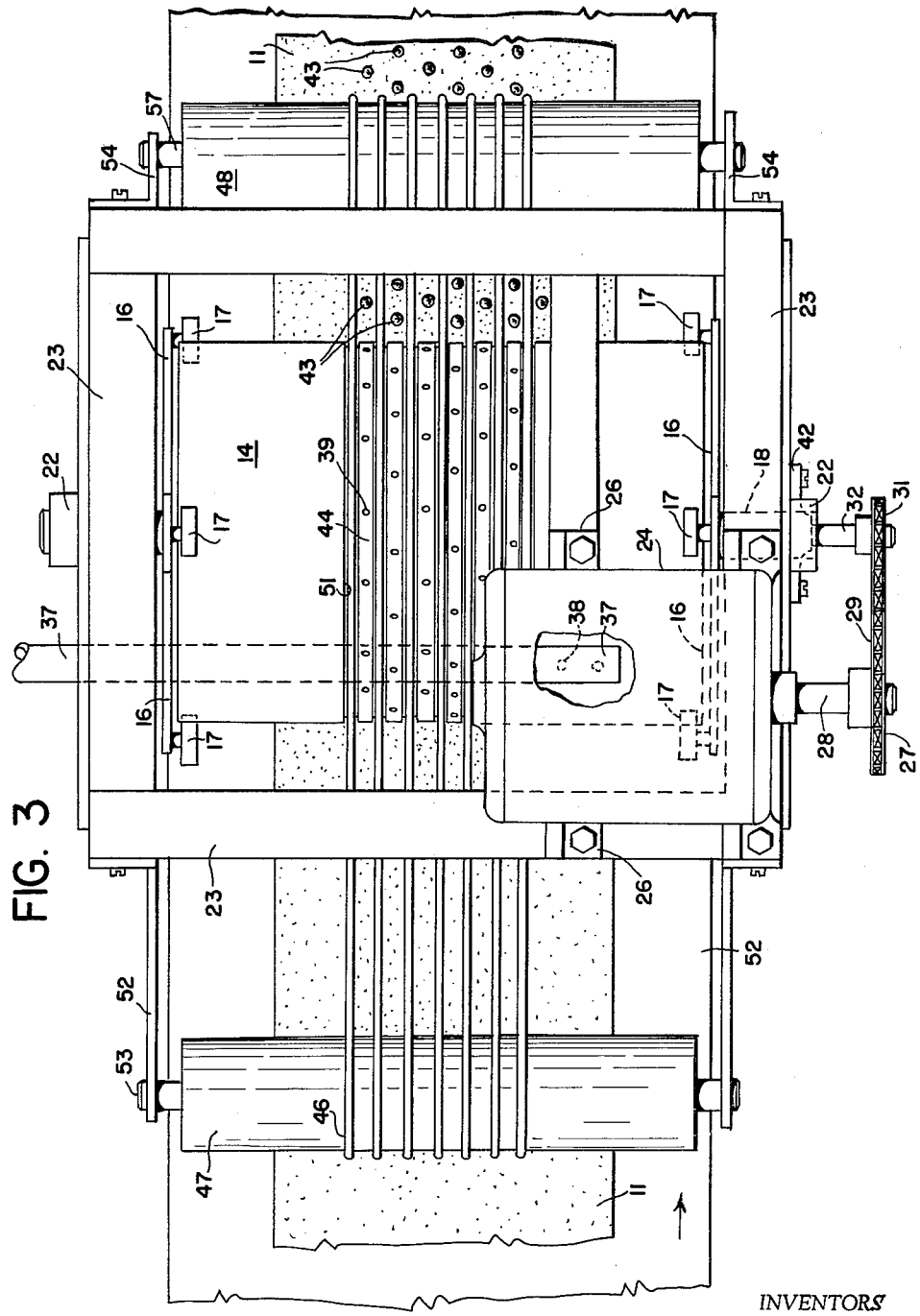

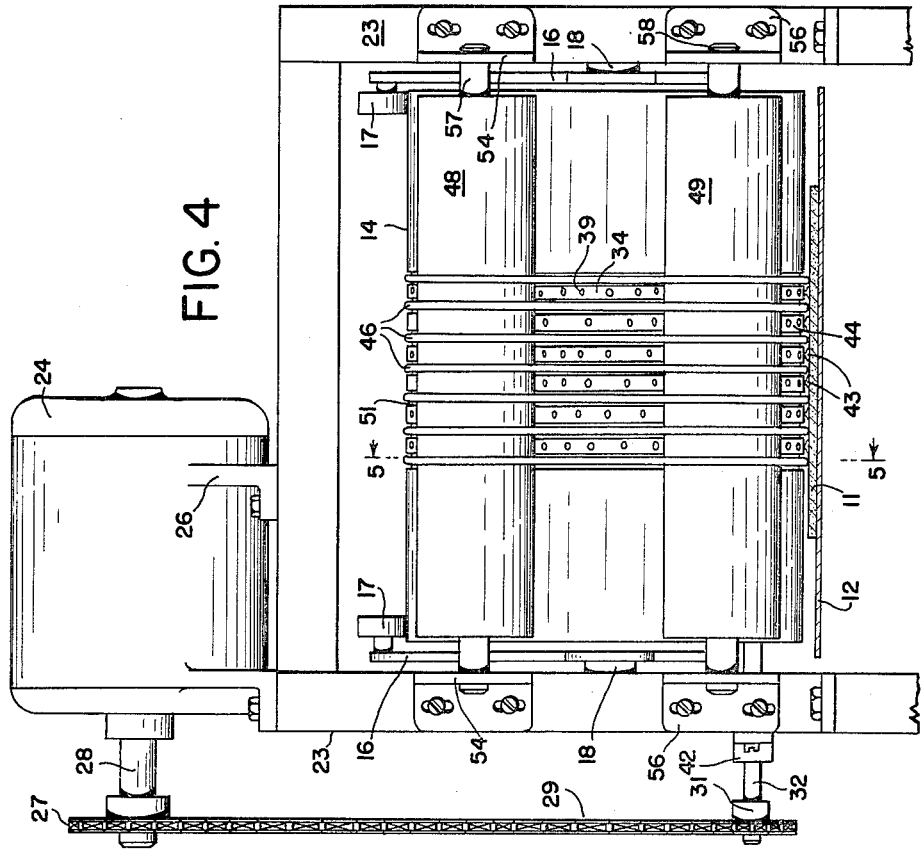

United States Patent Office 3,215,093
Patented Nov. 2, 1965

3,215,093
VISCOUS FLUID DEPOSITOR
William L. McKown and Verne E. Weiss, Minneapolis, Minn., assignors to General Mills, Inc., a corporation of Delaware
Filed July 9, 1962, Ser. No. 208,525
9 Claims. (Cl. 107—1)

This invention relates to apparatus for treating fluid material, and more particularly to apparatus for depositing droplets of viscous fluid on a sheet of material.

In the production of certain food products, it is desirable and often necessary to deposit viscous fluids such as fondant, cake icing, or batter in decorative patterns or predetermined patterns for processing. Deposition of such a fluid in predetermined patterns or decorative patterns presents numerous problems of controlling the faithful reproduction of the pattern with little or no variation, uniform deposition of the fluid, preservation of the material upon which the fluid is deposited, and numerous other problems. These problems of product control are accentuated when the deposition takes place on a mass production basis since base material, such as a sheet of dough, which receives the deposited pattern of viscous fluid is easily damaged or the movement of the base material results in a destruction of the predetermined pattern or decorative design. An example of the problem involved is illustrated by the situation where a predetermined pattern of viscous fluid, such as icing or fondant, is placed on a material such as a sheet of pastry dough in a mass production type system. The dough often sticks to the depositor due to the inherent adhesive qualities of the icings. This adhesion between the depositor and dough, results in non-uniform deposition of the icing, if not destruction of the decorative pattern, and often results in damage to the dough sheet.

An object of the invention is to provide a new and improved apparatus for treating fluid materials.

Another object of the invention is to provide a new and improved apparatus for depositing viscous fluid on a base material.

A further object of the present invention is to provide a new and improved apparatus for depositing droplets of viscous fluid in a predetermined pattern on a sheet of material.

Another object of the invention is to provide a new and improved apparatus for depositing droplets of viscous fluid material such as fondant on a sheet of pastry dough.

A still further object of the present invention is to provide a new and improved apparatus for depositing droplets of viscous fluid material such as fondant in a predetermined pattern on a moving sheet of pastry dough.

A still further object of the present invention is to provide an apparatus for depositing droplets of viscous fluid material in a predetermined pattern on a sheet of moving pastry dough while the sheet is spaced at a predetermined distance from a depositor in order to prevent destruction of the dough sheet due to adhesion of the sheet to the moving depositor.

With these and other objects in view, the present invention contemplates an apparatus utilizing a perforated drum for depositing a viscous fluid in a predetermined pattern as determined by the perforations on a sheet of moving pastry material. A roller or similar device driven by a gear system is mounted within the perforated drum to force the fondant through the perforations in the drum. A conveyor is utilized to move a sheet of pastry dough tangent to the periphery of the perforated drum so that the fondant is deposited on the sheet of dough. A series of tensioned bands or belts contact the periphery of the drum and separate the drum from the sheet of dough during the deposition of the fondant on the sheet.

A complete understanding of the invention may be obtained from the following detailed description of an apparatus forming specific embodiments, when read in conjunction with the drawings, in which;

FIGURE 1 is a front view of an apparatus forming an embodiment of the invention wherein a perforated drum is used as a depositor, FIGURE 2 is an enlarged fragmentary view of the drum shown in FIGURE 1 together with an associated sheet of material and viscous fluid, FIGURE 3 is a plan view of the apparatus shown in FIGURE 1, FIGURE 4 is a right end view of the apparatus shown in FIGURE 1 and FIGURE 5 is an enlarged fragmentary sectional view taken along line 5—5 of FIGURE 4 of the drum and associated components shown as a front view in FIGURE 1.

Refer first to FIGURE 1 which is a front view of an apparatus according to the invention. A sheet of dough or other food product 11 is carried or transported by a conveyor belt 12 in the arrowed direction as noted in FIGURE 1. The conveyor utilized is a conventional conveyor operated on pulleys 13. The dough sheet 11 may be any type of dough material such as dough for Danish pastries, dough for making cereal products, or simple bread-type doughs. The conveyor belt 12 moves the dough sheet 11 tangent to perforated drum 14. The perforated drum 14 is a drum utilized to deposit a fondant or other viscous fluid on the dough sheet 11 in a predetermined pattern as determined by the location of openings or perforations 39 in the drum 14.

The perforated drum 14 is mounted for rotation in the counterclockwise direction as viewed in FIGURES 1 and 5. The drum is mounted on three support arms 16 which have rollers 17 mounted at the extremities of the arms. Rollers 17 engage the outer periphery of the drum 14 near one end of the drum. There is a similar mounting system including another series of arms 16 and rollers 17 at the opposite end of drum 14 to suspend or support the opposite end of the cylindrical, perforated drum 14. Note FIGURE 4 for an end view of the apparatus which shows the support arms 16 and rollers 17 on either end of the cylindrical drum 14. The support arms 16 are rigidly mounted on shaft 18. The shaft 18 is mounted in a stationary block 22 and connected to support arm 16 by a key 21 (see FIG. 5). The bearing block 22 in turn is mounted on the frame or chassis 23 of the apparatus.

Drum 14 is driven by motor 24 through a suitable gear and sprocket arrangement. The motor 24 is mounted by mountings 26 on chassis 23. Drive sprocket 27 is mounted on drive shaft 28. Drive chain 29 engages drive sprocket 27 and sprocket 31 to rotate shaft 32. Spur gear 33 is also mounted on shaft 32 and engages a ring gear 34 which is rigidly connected to the inner wall of the perforated drum 14. The sprocket 31 and spur gear 33 are driven in the counterclockwise direction by chain 29 as viewed in FIGURE 1 so that the drum 14 is driven in the counterclockwise direction as previously noted. The drum 14 is mounted for rotation on rollers 17 which are connected to stationary support arms 16. Thus, perforated drum 14 is free to be driven at an angular velocity necessary to accomplish satisfactory deposition of a viscous fluid on the sheet of dough 11 which is moved tangentially past the drum 14.

The viscous fluid 36 (see FIG. 2) is introduced into the drum 14 by a pipe 37 which is positioned between the stationary arms 16 at one end of drum 14 (see FIGS. 1 and 3). Pipe or conduit 37 extends the length of the cylindrical drum 14 as noted in FIGURE 3 and has a series of outlets 38 along the length to permit viscous fluid to uniformly enter the drum along the length of drum 14. Uniform introduction of the viscous fluid into the drum 14 insures that adequate fluid is present at each of the perforations 39 in the drum 14 so that a uniform pattern of deposited viscous fluid is deposited on the pastry dough 11. Since the support arms 16 (see FIG. 1) are stationary, the pipe 37 may be stationary thus providing a simple system for introducing the viscous fluid into the drum 14. As previously noted, the drum 14 is driven by a sprocket and gear and arrangement which includes the ring gear 34 thus permitting such a system for introducing viscous fluid into the drum 14.

The viscous fluid is pumped into pipe 37 by a pumping system which is not shown but which is a conventional system well known in the art. The pipe 37 is positioned in perforated drum 14 so that the viscous fluid 36 is deposited in front of a roller 41 (see FIGS. 2 and 5). Roller 41 is a simple cylindrical roller having a smooth outer surface which is used to force the viscous fluid 36 through the perforations or openings 39 in the drum 14 for deposition on the sheet of dough 11 as the dough moves tangentially past the outer periphery of the drum 14. Roller 41 is mounted on shaft 32 so that the roller 41 moves with the drum 14 as the motor 24 drives sprocket 31. Note that both the drum 14 and the roller 41 are driven from the same drive system which includes the motor, the sprocket system, and gear system.

The shaft 32, upon which the roller 41 is mounted, is in turn mounted on brackets 42 which are connected to the frame 23 of the apparatus by bolts which fit into elongated horizontal slots 40, in chassis 23 (see FIG. 5). These elongated slots permit movement of the roller 41 so that it may be adjusted with respect to the inner periphery of drum 14. Vertical slots 45, similar to horizontal slots 40, are also provided in brackets 42 so that the roller 41 may be fully adjustable both vertically and horizontally. In FIG. 2 the roller 41 is shown in contact with the inner periphery of the drum 14, however it is equally possible to adjust the roller 41 so that the roller is separated by a predetermined distance from the inner periphery of the drum 14. The reason for providing this separation may be to provide more or less pressure on the viscous fluid 36 as it is squeezed between the roller 41 and the inner periphery of the drum 14. An adjusting device 50, see FIG. 1 is used to take up slack in chain 29 when roller 41 is moved.

After the fondant or viscous fluid 36 is deposited in front of roller 41, the apparatus is started and the roller 41 rotates in a counterclockwise direction together with the drum 14. The sheet of dough 11 moves in the direction of the arrow in FIGURE 2 tangent to the drum 14. The viscous fluid 36 is squeezed into the openings 39 in the drum 14 and the viscous fluid is deposited on the top surface 42 of the layer of dough 11. Since the volume of the openings 39 is uniform and constant, the rolling engagement between the roller 41 and drum 14 insures that each droplet 43 contains a uniform quantity of fluid. The roller 41 actually acts as a metering device since it repeatedly terminates the flow of fluid through each opening 39 in a uniform manner with the result that each droplet 43 contains a relatively precise quantity of fluid. This metering occurs even when roller 41 is spaced from the inner periphery of drum 14 since roller 41 provides uniform application and termination of pressure on the body of viscous fluid 36. The uniformity of the droplets 43 is still maintained.

The droplets 43 of fondant or viscous fluid 36 adhere to the sheet 11 due to the adhesive or sticky characteristic of the viscous fluid 36. The cooperation between the roller 41 and the inner surface or periphery of the drum 14 squeezes the viscous fluid through the channel 39 and into contact with the sheet of dough 11. Excess fluid 36 then passes between the roller 41 and the inner periphery of the drum 14 to the rear of the roller 41.

The size of drops 43 must be maintained relatively uniform and constant in order to provide quality control in the finished product. Consequently, a method is necessary for breaking or separating the fluid which is in the drum 14 from the droplets 43 which is adhering to the surface 11 of the dough product. Due to the relative movements of the drum 14 and the roller 41, the fluid 36 which is between the roller 41 and drum 14 on the left side of the roller 41, as viewed in FIGURE 2, is under compression and consequently the viscous fluid is forced through the opening 39 into contact with the sheet of dough 11. The reverse pressure condition exists on the right side of the roller 41 in FIGURE 2. The viscous fluid 36 on the right side of the roller 41 is under tension. The word tension is being used here to describe the pressure condition since the viscous fluid 36 is of such consistency that it adheres to roller 41 and drum 14 and a limited tensile force develops in the fluid. The tensile forces applied to the viscous fluid 36 on the right side of roller 41 are developed as a result of the relative motion of the roller 41 with respect to the inner periphery of the drum 14. The tensile forces are created as the fluid adheres to the surface of the roller 41 while it moves away from the inner surface of the drum 14. These tensile forces pull the fluid which is in channel 39 away from the droplet 43 which is attached to the surface 42 of the dough sheet 11. When the tensile forces are of a certain magnitude, the fluid which remains in the channel 39 breaks away from the fluid adhering to the sheet 11 thus forming a uniform droplet 43. The tensile forces also tend to clean the portion of the channel 39 which is nearest the sheet of dough 11 thus preventing the viscous fluid from running out of the channel 39 and coating the outer periphery of the drum 14 with a coat of sticky fluid.

In the event any fluid does adhere to the outer periphery of drum 14, a scraper blade 30 is provided to remove the fluid. Blade 30 is mounted in a holder 35, which is attached to chassis 23 (see FIGS. 1 and 5), so that it engages the outer periphery or surface of the drum and removes the adhering fluid to clean the drum surface. The blade 30 may be flexible so that it may be pressed directly against the drum without causing damage to the drum.

The openings 39 are placed in the drum 14 in a predetermined pattern as determined by the particular requirements of the finished product. FIGURE 3 illustrates one such pattern wherein the droplets are placed in spaced relationship in a particular line and where the openings 39 of alternate rows 44 of openings 39 are staggered. The pattern, after the droplets are deposited can be seen at the right side of the FIGURE 3 where the droplets 43 are in the predetermined pattern. Many other configurations or patterns can be arranged for the deposition of droplets 43 by simply changing the spaced relationship of the openings 39 and the rows 44. FIGURE 4 shows an end view of the machine illustrated in FIGURE 1. The deposited droplets 43 are shown at uniform distances from adjoining droplets 43 as determined by the placement of rows 44 on the surface of the drum 14, however this uniform placement of the rows 44 in the periphery of the drum 14 can easily be altered to accommodate different patterns of deposited droplets 43.

The viscous fluid 36 has adhesive characteristics and the dough of the dough sheet 11 also has some adhesive characteristics. Due to these characteristics of the products, the dough sheet 11 will adhere to the outer periphery of drum 14 if some apparatus is not used to prevent the adhesion. To prevent the moving dough sheet 11, with the deposited droplets of viscous fluid 36, from adhering to the outer periphery of drum 14, a series of bands 46 is used to separate the drum 14 from the sheet of dough 11 (see FIGS. 1, 3 and 4). The individual bands 46 may be flexible rubber bands which fit over guide rollers 47, 48 and 49.

The bands 46 are positioned in contact with the outer periphery of drum 14 which contains a series of grooves 51. A groove 51 is provided for each of the individual bands 46 to insure control of the bands 46.

The guide rollers 47, 48 and 49 are mounted for rotation on brackets. Guide roller 47 is mounted on brackets 52 which in turn are attached to the chassis 23 of the machine. A simple bearing arrangement, not disclosed, is used to mount shaft 53 on the bracket 52. Guide rollers 48 and 49 are connected to the chassis 23 by brackets 54 and 56 respectively. The guide roller shafts 57 and 58 respectively may also be mounted on brackets 54 and 56 in a manner as previously noted for roller 47. The guide rollers are freely rotatable with the bands 46.

The bands 46 are maintained in continuous contact with the periphery of drum 14 and consequently one or more of the guide rollers should preferably be mounted on a movable or adjustable bracket so that the bands 46 may be tightened and moved into contact with the periphery of the drum 14. No adjustable feature has been disclosed in the drawings, however it is believed that such an adjustable bracket is easily provided from such brackets well known in the art. The tensioned bands 46 are in contact with the dough sheet 11 as noted in FIGURES 2 and 5 and the band 46 is also in contact with the top of the drum 14 as noted in FIGURE 1. The bands 46 are placed about the periphery of the drum 14 in groove 51 (see FIGURE 4), in spaced relationship with the rows 44 of openings 39 which are in the drum 14. The individual bands 46 are in physical contact with the dough sheet 11 and maintain the drum 14 a predetermined distance from the dough sheet 11. The droplets 43 are thus squeezed from the openings 39 in the drum 14 and the space provided by the bands 46 is the area into which the droplets form and are severed from the body of viscous fluid within the drum 14.

The bands 46 also serve another function of separating or maintaining the dough sheet 11 apart from the surface of drum 14. Guide roller 49 is placed in the apparatus so that the band 46 leaves the surface of drum 14 at a very shallow angle with respect to the moving dough sheet 11. Any tendency of the dough sheet 11 to adhere to the surface of the drum 14 is prevented by the bands 46. The very small angle between the band 46 and the dough sheet 11, as the sheet disengages the drum 14, prevents the dough sheet 11 from rising a great distance above the surface of the belt 12 which is conveying the sheet. This prevents any damage to the dough sheet 11 if it should begin to adhere to the outer surface of the drum 14. Since the bands 46 are tensioned and are in contact with the moving drum 14, the bands 46 move on the freely movable guide rollers 47, 48 and 49 and move in a counterclockwise direction but in the same linear direction as the moving dough sheet 11. This movement of the bands 46 in the same linear direction as the dough sheet 11 prevents any abrasions or tendency of the bands 46 to damage the surface of the dough sheet 11. The number of bands 46 necessary for a particular pattern of deposited droplets of viscous fluid will depend upon the adhesive characteristics of the fluid and the dough sheet 11. As the adhesive characteristics of the products involved increase, an increasing number of bands 46 may be necessary to prevent the sheet 11 from adhering to the periphery of the drum 14. In FIGURES 3 and 4 it is noted that a band 46 is provided between each row 44 of channels 39. This scheme may be varied according to the requirements of the particular products involved.

Thus it can be seen that the conveyor 12 carries a sheet of dough 11 into engagement with the depositor drum 14 where a series of droplets 43 are deposited on the sheet 11. The bands 46 space the drum 14 a predetermined distance from the dough sheet 11 and prevent adherence of the dough sheet 11 to the periphery of the drum 14 after the droplets 43 are deposited on the sheet 11. The dough sheet 11 with the predetermined pattern of droplets 43 then moves away from the perforated drum 14 to a subsequent work station where further processing of the product commences.

It is to be understood that the above described arrangements are simply illustrative of the application of the principles of the invention. Numerous other arrangements may be readily devised by those skilled in the art which will embody the principles of the invention and fall within the spirit and scope thereof.

Now, therefore, we claim:

1. An apparatus for depositing a viscous fluid on a sheet of material which comprises a drum to contain said fluid and having perforations for depositing said fluid, means for rotating said drum, means for moving said sheet in close proximity to said drum, and rotary roller means mounted within said drum for forcing said fluid through said perforations into contact with said sheet for deposit of a quantity of said fluid on said sheet and subsequently terminating further deposit of said fluid onto said sheet by rupturing the fluid connections filling said perforations by tensile forces thereon created by adhesion of the fluid within the drum to said rotary roller means.

2. An apparatus for depositing a viscous fluid on a sheet of material which comprises a drum to contain said fluid and having perforations for depositing said fluid, means for rotating said drum, means for moving said sheet in close proximity to said drum, means mounted within said drum for forcing said fluid through said perforations onto said sheet, and means in contact with said drum and mounted between said drum and said sheet for causing the sheet to move in a path diverging from the periphery of said drum.

3. An apparatus in accordance with claim 2 in which said last named means includes a series of flexible bands which contact the periphery of said drum to prevent said sheet carrying said viscous fluid from adhering to said drum.

4. An apparatus for depositing a viscous fluid on a sheet of material which comprises a chassis, a drum to contain said fluid and having perforations for depositing said fluid, means contacting the outer periphery of said drum for movably mounting said drum on said chassis, means for moving said sheet in close proximity to said drum, means mounted within said drum for forcing said fluid through said perforations onto said sheet, drive means interconnecting said drum and means for forcing, and means interposed between said sheet and said drum for causing the sheet to move in a path diverging from the periphery of said drum.

5. An apparatus for depositing a viscous fluid on a sheet of material which comprises a drum to contain said fluid and having perforations for depositing said fluid, means for rotating said drum, means for moving said sheet in close proximity to said drum, means mounted within said drum for forcing said fluid through said perforations onto said sheet, means engaging the outer periphery of said drum for removing excess discharged fluid, and means in contact with said drum and mounted between said drum and said sheet for causing the sheet to move in a path diverging from the periphery of said drum.

6. An apparatus for depositing a viscous fluid on a sheet of material which comprises a chassis, a drum to contain said fluid and having perforations for depositing said fluid, means contacting the outer periphery of said drum for movably mounting said drum on said chassis, means for moving said sheet in close proximity to said drum, means mounted within said drum for forcing said fluid through said perforations onto said sheet, a scraper blade mounted on said chassis and contacting said periphery of said drum to remove excess fluid, drive means interconnecting said drum and means for forcing, and means interposed between said sheet and said drum for causing the sheet to move in a path diverging from the periphery of said drum.

7. An apparatus for depositing a viscous fluid on a sheet of material which comprises a drum to contain said fluid and having perforations for depositing said fluid, means for continuously introducing a supply of said fluid into said drum, means for rotating said drum, means for moving said sheet in close proximity to said drum, means mounted within said drum for forcing said fluid through said perforations onto said sheet, and means in contact with said drum and mounted between said drum and said sheet for causing the sheet to move in a path diverging from the periphery of said drum.

8. An apparatus for depositing a viscous fluid on a sheet of material which comprises a drum to contain said fluid and having perforations for depositing said fluid, a conveyor for moving said sheet in close proximity to the periphery of said drum, a roller mounted within said drum for forcing said fluid through said perforations onto said sheet, a gear system interconnecting said roller and drum for driving said drum and roller, and a band in contact with said drum and mounted between said drum and said sheet for causing the sheet to move in a path diverging from the periphery of said drum.

9. An apparatus for depositing a viscous fluid on a sheet of material which comprises a chassis, a drum to contain said fluid and having perforations for depositing said fluid, support arms contacting the periphery of said drum for movably mounting said drum on said chassis, a conveyor for moving said sheet in close proximity to the periphery of said drum, means for continuously introducing a supply of said fluid into said drum, a roller mounted within said drum for forcing said fluid through said perforations onto said sheet, a gear system interconnecting said roller and drum for driving said drum and roller, and a series of tensioned bands in contact with said drum and mounted between said drum and said sheet for causing the sheet to move in a path diverging from the periphery of said drum.

References Cited by the Examiner
UNITED STATES PATENTS

| | | | |
|---|---|---|---|
| 1,220,845 | 3/17 | Hitchner | 107—1 |
| 2,189,214 | 2/40 | MacFarlane et al. | 107—27 |
| 2,424,949 | 7/47 | White | 107—54 |
| 2,851,003 | 9/58 | Binsted et al. | 107—1 XR |
| 3,052,210 | 9/62 | Hughes | 118—211 XR |

ROBERT E. PULFREY, *Primary Examiner.*

CHARLES A. WILLMUTH, *Examiner.*